United States Patent [19]
Challener, IV

[11] Patent Number: 5,986,997
[45] Date of Patent: Nov. 16, 1999

[54] UPDATABLE OPTICAL DATA STORAGE DISC HAVING REDUCED CROSSTALK BETWEEN TRACKS, AND DRIVE FOR SAME

[75] Inventor: William A. Challener, IV, Grant Township, Minn.

[73] Assignee: Imation Corp., Oakdale, Minn.

[21] Appl. No.: 08/927,027

[22] Filed: Sep. 10, 1997

[51] Int. Cl.[6] ...................................................... G11B 7/00
[52] U.S. Cl. .................. 369/121; 369/275.1; 369/275.2; 369/107
[58] Field of Search .......................... 369/13, 121, 275.1, 369/275.2, 275.3, 275.4, 275.5, 116, 44.41, 124, 107

[56] References Cited

U.S. PATENT DOCUMENTS

| | | | |
|---|---|---|---|
| 4,547,875 | 10/1985 | Ohta et al. | 369/109 |
| 4,569,038 | 2/1986 | Nagashima et al. | 369/111 |
| 5,168,490 | 12/1992 | Braat | 369/109 |
| 5,179,547 | 1/1993 | Komaki et al. | 369/275.4 |
| 5,493,561 | 2/1996 | Nishiuchi et al. | 369/275.1 |
| 5,608,710 | 3/1997 | Minemura et al. | 369/116 |
| 5,654,953 | 8/1997 | Yoshida et al. | 369/275.1 |
| 5,835,479 | 11/1998 | Miyagawa et al. | 369/275.2 |

FOREIGN PATENT DOCUMENTS

| | | |
|---|---|---|
| 0 295 572 | 12/1988 | European Pat. Off. . |
| 0 737 967 A2 | 10/1996 | European Pat. Off. . |
| 59-207039 | 11/1984 | Japan . |
| 7-311980 | 11/1995 | Japan . |
| 8-329528 | 12/1996 | Japan . |
| 8-329529 | 12/1996 | Japan . |
| 9-081967 | 3/1997 | Japan . |

OTHER PUBLICATIONS

*Principles of Optical Disc Systems,* "Mastering," J. Pasman, 1985, Adam Hilger Ltd., Bristol and Boston, pp. 189, 208–209.

*Optical Recording: a technical overview,* Alan B. Marchant, 1990, Addison–Wesley Publishing Company, Inc., pp. 84–88 and 172–181.

"Detecting transition regions in magneto–optical disk systems," Mansuripur, *Appl. Phys lett.*, 55(8), 21 Aug. 1989, pp. 716–717.

"Edge detection for magnetooptical data storage," Levenson et al., *Applied Optics,* vol. 30, No. 2, Jan. 10, 1991, pp. 232–252.

"Edge Shift Characteristics of a Magnetooptical Edge Detection Signal," Yamaguchi et al., *Jpn. J. Appl. Phys.*, vol. 32 (1993), pp. 5349–5353.

"Edge Detection in Phase–change Optical Data Storage," Peng et al., Optical Data Storage Conference, Sprin 1997, Tucson, AZ.

"Edge Detection in phase–change optical data storage," Peng et al., *Appl. Phys. Lett.*, 71(15), Oct. 13, 1997, pp. 2088–2090.

"Crosstalk–Free Condition for Land/Groove Recording of Optical Discs," Ooki, *Optical Review,* vol. 2, No. 1 (1995), pp. 1–3.

*Primary Examiner*—John W. Cabeca
*Assistant Examiner*—Kim-Kwok Chu
*Attorney, Agent, or Firm*—Eric D. Levinson

[57] ABSTRACT

An updatable optical data storage disc for use with a laser includes a substrate and a recording layer. The substrate contains pre-recorded information in the form of concentric or spiral tracks of pits. Recordable tracks are positioned between adjacent pre-recorded tracks, whereby the tracks on the disc alternate in the radial direction. Laser light reflected from the recorded portions of the recording layer has a different phase than does light reflected from the unrecorded portions. This phase difference must be significant enough to be sensed by the detector. The difference in the reflectivity of the unrecorded and recorded portions of the recording layer should be minimized. The invention also includes a method and drive compatible with the disc.

33 Claims, 1 Drawing Sheet

UPDATABLE OPTICAL DATA STORAGE DISC HAVING REDUCED CROSSTALK BETWEEN TRACKS, AND DRIVE FOR SAME

FIELD OF THE INVENTION

The present invention relates to updatable optical data storage discs.

BACKGROUND OF THE INVENTION

Optical discs, such as CD-ROM (Compact Disc-Read Only Memory) or DVD-ROM (Digital Versatile Disc) media, have data stored as a series of lower "pits" formed within a plane of higher "lands". The pits are arranged in a spiral track originating at the disc's center hub and ending at the disc's outer rim. The CD-ROM and DVD-ROM formats allow for discs that are inexpensive to produce yet have high storage densities. DVD-5, which was launched in 1997, has a diameter of 120 mm and a capacity of 4.7 gigabytes (GB). However, such discs are pre-recorded and cannot be recorded on by the end user.

Rewritable optical discs typically come in the form of magneto-optical or phase-change discs. DVD-RAM (random-access-memory) are rewritable phase-change discs. These discs have a spiral tracking groove comprised of pits having a depth of about $\lambda/4$ n, or about 103 nm for a laser wavelength, $\lambda$, of 650 nm, and a refractive index, n, of 1.58. Data may be recorded by the end user in the grooves.

In phase-change discs, the recording layer is a material that can exist in two different solid phases. The material can be switched from one stable phase to another by appropriate heating by a read/write laser. Typical phase-change materials are multicomponent alloys that have a stable, compatible, crystalline phase and a metastable amorphous phase with different optical properties, namely, a different coefficient of reflectivity, R. Recording is accomplished by locally melting the recording material and then cooling it quickly enough to quench it in the amorphous phase. The material in the amorphous state (i.e., the recorded bit) can be erased by annealing by heating the bit to a temperature for a long enough period of time to recrystallize the bit. Typical phase-change materials include GeTeSb and AgInTeSb.

The specification for DVD-RAM as of August 1997 calls for a capacity of 2.7 GB. DVD-RAM discs contain no pre-recorded data (other than servo and/or format information). If any such data were recorded prior to sale to the end user, such data would detract from the 2.7 GB of recordable storage available to the end user.

SUMMARY OF THE INVENTION

It would be desirable to have an updatable phase-change disc which had the advantages of both the data densities associated with standard pre-recorded discs such as DVD-ROM as well as the recording capacity of rewritable optical media, such as DVD-RAM.

Accordingly, the present invention is directed to an updatable optical data storage disc for use with a laser having a wavelength $\lambda$. The disc includes a substrate containing pre-recorded information in the form of concentric or spiral tracks of pits and a recording layer on the pitted side of the substrate. In unrecorded portions of the recording layer, light from the laser reflected from the recording layer has a first phase, $P_1$, and a first reflectivity, $R_1$. In recorded portions of the recording layer, light reflected from the recording layer has a second phase, $P_2$, and a second reflectivity, $R_2$. The absolute value of the difference between the two phases ($|P_1-P_2|$) is preferably in the range of 30°–100°, more preferably 40°– 80°, and most preferably 50°–70°. The difference between the two reflectivities ($R_1-R_2$) should be minimized, and in any event should be less than 40% of the average of the two reflectivities 0.4 (($R_1+R_2$)/2), more preferably less than 20%, and most preferably less than 10%. $R_1$ and $R_2$ are each preferably in the range of 15 to 40°.

The disc may be designed for use with a substrate-incident optical system. The recording layer is preferably in a crystalline state in unrecorded portions and an amorphous state in recorded portions. The recording layer preferably has a thickness within the range from about 20 to 40 nm. One preferred material for the recording layer is TeGeSb.

In one preferred embodiment, recordable tracks are positioned adjacent the pre-recorded tracks, whereby the tracks on the disc alternate in the radial direction between pre-recorded and recordable information. The disc preferably includes dielectric layers on each side of the recording layer.

The wavelength $\lambda$ of the laser is preferably in the range of 400–800 nm. The pits should have a depth in the range of $\lambda/8$ to $\lambda/4$ (typically 80–140 nm depending on the wavelength), more preferably about $\lambda/6$.

In a preferred embodiment, in the land portions between the pits in a pre-recorded track, light reflected from the optical stack has one phase, $P_3$, while light reflected in the pits has another phase, $P_4$. The absolute value of the difference between the two phases ($|P_3-P_4|$), is preferably in the range from 120° to 240°, more preferably 160° to 200°. Usually, $P_3$, the phase for light reflected in the land areas between the pits in each pre-recorded track, will be substantially equal to $P_1$, the phase for light reflected in the unrecorded portions of the recordable tracks between the pre-recorded tracks.

The present invention also includes a method of reading the updatable storage disc described above. A laser beam is directed onto the pre-recorded tracks and deflected by a split detector having two detectors parallel to and aligned with the length of the pre-recorded tracks. The split detector generates a signal using the sum of the measured outputs of the detectors, thereby reading the data in the pre-recorded tracks. For the recordable tracks, the split detector generates a signal using the difference between the measured output of the two detectors. Data may be recorded in the recordable tracks by increasing the intensity of the laser to locally melt the recording layer and cooling the bit quickly enough to quench it in the amorphous state.

The present invention also includes a drive for the disc described above. The drive includes a laser, a split detector, and two sets of electronics. The laser is operable at a first energy level to read data on the disc and a second, higher energy level to write data in the recordable tracks. The split detector includes at least two detectors parallel to and aligned with the length of the pre-recorded tracks and spaced from each other such that one detector receives light reflected from a leading edge of the laser beam on a recorded bit while another detector receives light reflected from a trailing edge of the laser beam. The first electronics generates a first signal using the sum of the measured outputs of the detectors, thereby allowing the drive to read data in the pre-recorded tracks. The second electronics generates a second signal using the differential of the measured outputs of the detectors, thereby allowing the drive to read data in the recordable tracks.

DETAILED DESCRIPTION

Figure 1:
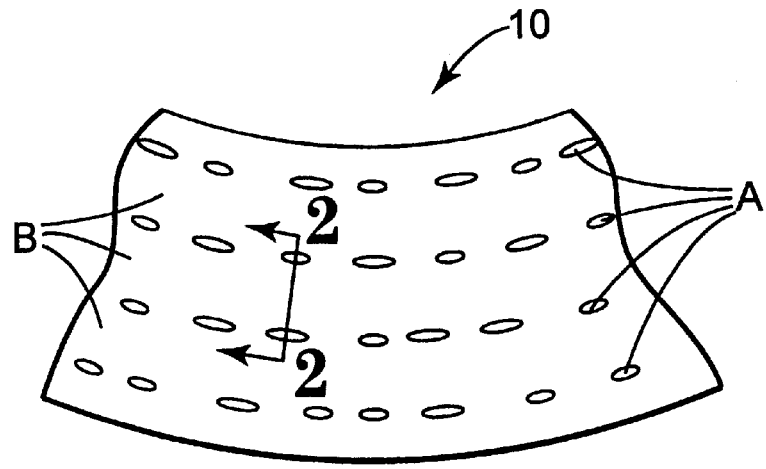
FIG. 1 shows an overhead view of a portion of a disc according to the present invention.

An updatable optical data storage disc 10 according to the present invention is shown in FIG. 1. Disc 10 includes a spiral or concentric pattern of pits A containing pre-recorded data, as well as other information such as tracking, servo, and format information. Data may be recorded by the end user in data tracks B which are provided between data pit tracks A.

Figure 2:
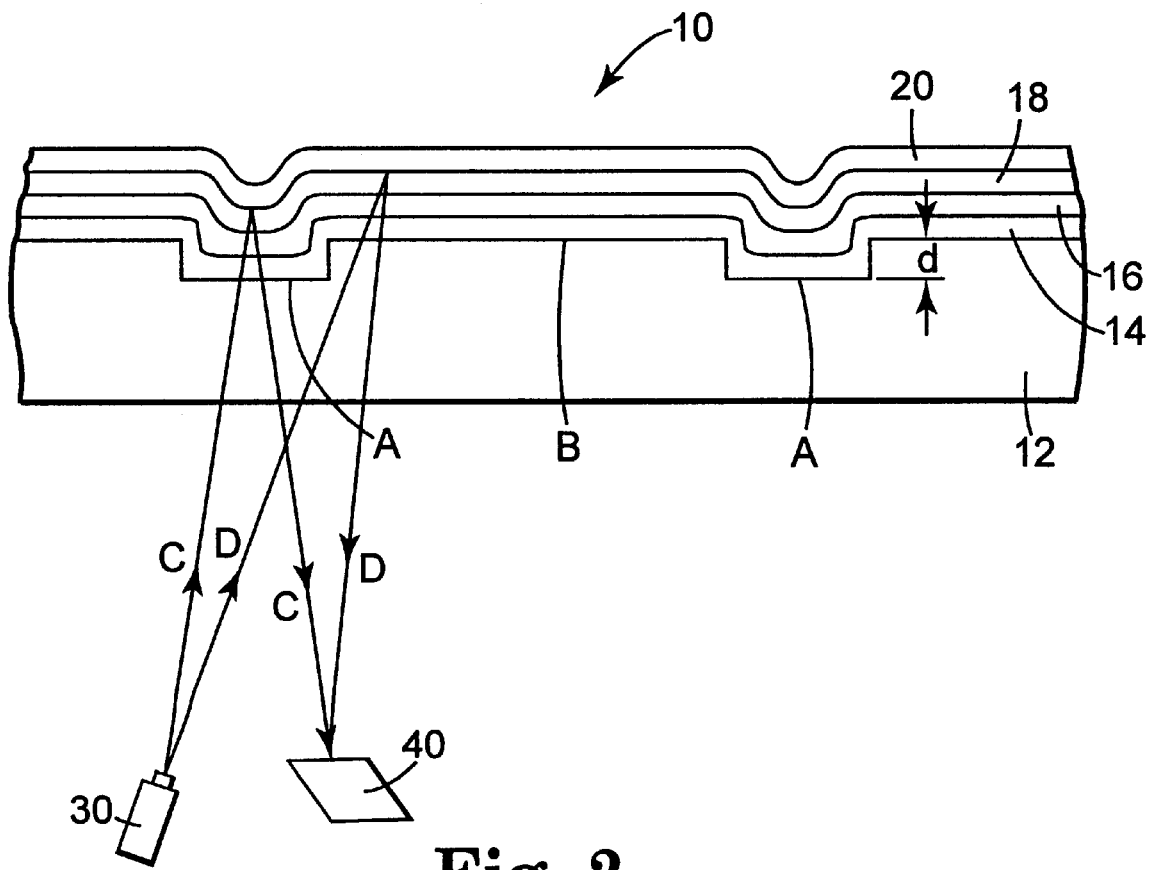
FIG. 2 shows a cross-sectional view of the disc of FIG. 1 taken along the lines 2—2.

A cross-sectional view of disc 10 taken along line 2—2 is shown in FIG. 2. Disc 10 comprises a substrate 12, a first dielectric layer 14, a recording layer 16, a second dielectric layer 18, and a reflecting layer 20. Additional layers may be provided over reflecting layer 20, such as a protective layer.

Laser beam 30 directs light beams C and D (but not both simultaneously) toward disc 10 and through substrate 12. Light beams C and D are reflected by the stack of layers and reflecting layer 20 toward split detector 40, which detects reflected light intensity. Split detector 40 comprises at least two detectors, but may include four detectors or more. The at least two detectors should be oriented such that a line connecting the centers of the two detectors is parallel to and aligned with the track it is reading/writing. In other words, each detector would be reading the same track but would be spaced from each other along the track direction. This spacing is such that one detector receives light from the leading edge of the laser beam on the recorded bits while the other detector receives light from the trailing edge of the laser beam. Laser 30 may track on either of data pit tracks A or recordable tracks B.

When laser 30 follows data pit tracks A, laser beam C strikes and is reflected at reflecting layer 20 over the data pits or lands between adjacent pits in a given data pit track A. The pits have a depth of about $\lambda/4$ n, where $\lambda$ is the wavelength of laser beam 30 and n is the refractive index of substrate 12. For DVD products, the substrate is polycarbonate which has an index of refraction n of 1.58 and the laser beam has a wavelength $\lambda$ of 650 nm and thus the pits should have a depth of about 650 nm/4(1.58) or about 103 nm. For most substrates 12, the product of 4 n is about 6. This pit depth is selected so that the difference in the beam path length between a beam which strikes a pit and a land is equal to $2\lambda/4$ n, or $\lambda/2$ n. This ensures that the two beams are 180° out of phase, enabling easy detection of changes in light intensity at split detector 40. The information in data pit tracks A is then read by split detector 40 using the sum of the signals received from each of the two detectors ("the sum channel").

When laser 30 follows data tracks B, laser beam D is reflected by the optical stack in substrate 12 and data recorded by the user may be read by split detector 40 using edge detection. Light reflected from bits that are in one state (e.g., unrecorded bits), has a given reflectivity, $R_1$ and phase $P_1$, and light reflected from bits in a second state (e.g., recorded bits) has a second reflectivity, $R_2$, and a second phase, $P_2$. The information in recordable data tracks B is then read by split detector 40 using the difference between the signals received from each of the two detectors ("the difference channel"). Bits may be recorded in recordable data tracks B by laser 30 in the conventional manner, i.e., by using laser 30 at a higher intensity to locally melt the recording material and cooling it quickly enough to quench it in the amorphous phase.

The phase-change material that comprises recording layer 16 is chosen so that the change in phase ($\Delta P$) of light reflected from unrecorded bits ($P_1$) and recorded bits ($P_2$) is within the range from 30°–100°, more preferably from 40°–80°, and still more preferably about 50°–70°. It is also desirable to minimize the difference in reflectivity, R, between the unrecorded bit ($R_1$) and the recorded bit ($R_2$). The difference between the two reflectivities ($\Delta R$) is preferably less than 40%, and more preferably less than 20% of the average of $R_1$ and $R_2$, i.e., $$|R_1 - R_2| < \left(\frac{R_1 + R_2}{2}\right).$$

The reflectivities $R_1$ and $R_2$ are preferably within the range of 15–40%.

As explained above, the depth of the pits in data pit tracks A is about $\lambda/4$ n, so that there is a phase shift of about 180° between light reflected by the pits or the lands between the pits. Although a phase shift of about 180° is desired, a phase shift within the range of 120°–240° is sufficient, although a range of 160°–200° is preferable.

The ranges for the phase shifts between the pit and land (preferably about 180° but possibly between 120° and 240°) and the unrecorded and recorded bits (preferably between 50° and 70°) are chosen so that they do not overlap. This minimizes the likelihood of cross-talk, i.e., undesired signal from the neighboring track. By minimizing cross-talk, it is possible to arrange adjacent data tracks more closely together without the danger that the laser measured signal will be adversely affected by nearby data tracks. By decreasing the spacing between adjacent data tracks, it is possible to increase the storage density of a given disc.

Preferred materials for the components of disc 10 will now be discussed.

Substrate 12 is preferably transparent, has very low birefringence, and is nominally 0.6 to 1.2 mm thick depending on the product implementation. Suitable materials include glass, polymethylmethacrylate (PMMA), polycarbonate, and amorphous polyolefin (APO).

Dielectric layers 14 and 18 preferably comprise a dielectric material such as yttrium oxide, aluminum oxide, silicon carbide, silicon nitride, or silicon dioxide. Dielectric layers 14 and 18 typically have thicknesses in the range of 5 to 100 nm.

Recording layer 16 may comprise a rewritable recording material or a write-once material. For a write-once application, suitable materials for recording layer 16 include eutectic alloys, dye polymers, ablative, and bubble-forming materials. For rewritable applications, the material must be capable of undergoing a change in its optical properties (e.g., phase change) during the recording process. Preferred materials for a rewritable recording layer 16 include GeTeSb and AgInSbTe. The thickness of a phase-change recording layer 16 is preferably within the range of about 20–40 nm.

Reflecting layer 20 preferably has a high reflectivity, such as AlCr.

Although the present invention has been described with respect to pit depths designed to create a phase shift of about 180° and recordable materials designed to create a phase shift of about 50°–70°, those skilled in the art will appreciate that this invention could also be implemented by interchanging these values, i.e., by using pit depths which cause a phase shift of about 50°–70° and by using recordable materials which cause a phase shift of about 180°.

The invention will now be further illustrated by the following non-limiting Example. All measurements are approximate.

EXAMPLE

An updatable DVD-ROM was constructed of the following materials:

| Material | Thickness |
| --- | --- |
| glass substrate | 1.2 mm |
| $(ZnS)_{0.8}$—$(SiO_2)_{0.2}$ | 10 nm |
| $Ge_{0.22}Te_{0.56}Sb_{0.22}$ | 30 nm |
| $(ZnS)_{0.8}$—$(SiO_2)_{0.2}$ | 44.5 nm |
| $Al_{0.97}Cr_{0.03}$ | 100 nm |

The glass substrate had pre-recorded information in the form of pits having a depth of about 83 nm and a track pitch of 0.72 μm.

The pre-recorded information on the disc was read by a 635 nm wavelength laser directed at data pit tracks A and detecting the reflection of the beam with a split detector using the standard sum channel. The resultant oscilloscope eye pattern was such that a standard DVD-ROM drive would be able to distinguish between the signal and background noise.

The laser was then directed toward the region between adjacent pit tracks (i.e., recordable tracks B) and the resultant signal using the difference channel of the split detector was measured, thus measuring the cross-talk between the recordable track B and the two adjacent pre-recorded tracks of pits A. The cross-talk from the pre-recorded tracks was measured to be at least 30 dB smaller than the signal from the pre-recorded tracks, indicating that there was minimal interference from the adjacent pre-recorded tracks.

While still tracking on the recordable track B, various frequencies of square wave tones were recorded. The recordable track B was then read with the laser and split detector using the difference channel. For mark lengths of 0.52 μm and larger, the measured carrier-to-noise ratio (CNR) was greater than 40 dB.

The laser was then redirected toward adjacent pre-recorded tracks A to see if the recorded signal in the recordable tracks B interfered with the reading of the signal from the pits in the pre-recorded tracks. No signal (i.e., less than 5 dB) was observed in the sum channel at the frequency of the recorded tone in the neighboring recordable track.

I claim:

1. An updatable optical data storage disc, for use with a laser having a wavelength λ, comprising:
    a substrate containing pre-recorded information in the form of concentric or spiral tracks of pits; and
    a recording layer on the pitted side of the substrate wherein light from the laser reflected from the recording layer has a first phase, $P_1$, in unrecorded portions of the recording layer and a second phase, $P_2$, in recorded portions of the recording layer, wherein $30° < |P_1 - P_2| < 100°$, and wherein light reflected from the recording layer has a first reflectivity, $R_1$, in unrecorded portions thereof, and a second reflectivity, $R_2$, in recorded portions, wherein $|R_1 - R_2| < 0.2((R_1 + R_2)/2)$.

2. The disc of claim 1, wherein the disc is designed for use with a substrate-incident optical system.

3. The disc of claim 1, wherein $40° < |P_1 - P_2| < 80°$.

4. The disc of claim 1, wherein $50° < |P_1 - P_2| < 70°$.

5. The disc of claim 1, wherein the recording layer is in a crystalline state in unrecorded portions thereof and an amorphous state in recorded portions thereof.

6. The disc of claim 1, wherein the recording layer has a thickness of from about 20 nm to 40 nm.

7. The disc of claim 1, wherein the recording layer includes TeGeSb.

8. The disc of claim 1, wherein $|R_1 - R_2| < 0.1((R_1 + R_2)/2)$.

9. The disc of claim 1, wherein $15\% < R_1 < 40\%$ and $15\% < R_2 < 40\%$.

10. The disc of claim 1, wherein recordable tracks are positioned between adjacent pre-recorded tracks, whereby the tracks on the disc alternate in the radial direction between pre-recorded tracks and recordable information.

11. The disc of claim 1, wherein the pits have a depth between about 80 and 140 nm.

12. The disc of claim 1, wherein 400 nm < λ < 800 nm.

13. The disc of claim 1, wherein the pits have a depth between λ/4 and λ/8.

14. The disc of claim 1, wherein the pits have a depth of about λ/6.

15. The disc of claim 1, further including a first dielectric layer between the substrate and recording layer and a second dielectric layer on an opposite side of the recording layer.

16. The disc of claim 1, wherein light from the laser reflected from the pitted side of the substrate in the pre-recorded tracks in land portions of the substrate between the pits has a third phase, $P_3$, and light from the laser reflected from the pits has a fourth phase, $P_4$, wherein $120° < |P_3 - P_4| < 240°$.

17. The disc of claim 1, wherein $160° < |P_3 - P_4| < 200°$.

18. An updatable optical data storage disc for use with a laser having a wavelength λ, comprising, in order:
    a transparent substrate having pre-recorded information in the form of concentric or spiral tracks of pits having depths of about 80 to 140 nm;
    a first dielectric layer over the pitted side of the substrate;
    a recording layer over the first dielectric layer wherein light from the laser reflected from unrecorded portions of the recording layer has a first phase, $P_1$, and light from the laser reflected from the recorded portions of the recording layer has a second phase, $P_2$, wherein $40° < |P_1 - P_2| < 80°$;
    a second dielectric layer; and
    a reflecting layer;
    wherein light from the laser reflected from the pitted side of the substrate in the pre-recorded tracks in land portions of the substrate between the pits has a third phase, $P_3$, and light from the laser reflected from the pits has a fourth phase, $P_4$, where $120° < |P_3 - P_4| < 240°$; and wherein recordable tracks are positioned between adjacent pre-recorded tracks, whereby the tracks on the disc alternate in the radial direction between pre-recorded tracks and recordable tracks.

19. The disc of claim 18, wherein the recording layer is in a crystalline state in unrecorded portions thereof and an amorphous state in recorded portions thereof.

20. The disc of claim 18, wherein the recording layer has a thickness of from about 20 to 40 nm.

21. The disc of claim 18, wherein light reflected from the recording layer in an unrecorded portion has a first reflectivity, $R_1$, and light reflected from the recording layer in a recorded portion has a second reflectivity, $R_2$, wherein $$|R_1 - R_2| < \left(\frac{R_1 + R_2}{2}\right).$$

22. The disc of claim 21, wherein $15\% < R_1 < 40\%$ and $15\% < R_2 < 40\%$.

23. The disc of claim 18, wherein 400 nm < λ < 800 nm.

24. The disc of claim 18, wherein $160° < |P_3 - P_4| < 200°$.

25. A method of reading an updatable optical data storage disc, comprising the steps of:
    providing an updatable optical data storage disc comprising:
        a substrate containing pre-recorded information in the form of concentric or spiral tracks of pits; and a recording layer on the pitted side of the substrate wherein light from the laser reflected from the recording layer has a first phase, $P_1$, in unrecorded portions of the recording layer and a second phase, $P_2$, in recorded portions of the recording layer, wherein $30° < |P_1 - P_2| < 100°$;

directing a laser beam having a wavelength $\lambda$ onto the pre-recorded tracks and using a split detector comprising first and second detectors parallel to and aligned with the length of the pre-recorded tracks to generate a signal using the sum of the measured outputs of the detectors, thereby reading data in the pre-recorded tracks; and directing the laser beam onto recordable tracks provided between adjacent pre-recorded tracks and using the split detector to generate a signal using the difference between the measured outputs of the detectors, thereby reading data in the recordable tracks.

26. The method of claim 25, wherein the method further includes writing data on the recordable tracks, further including the step of:

directing the laser beam onto the recordable tracks and increasing the intensity of the laser to locally melt the recording layer and cooling it quickly enough to quench it in an amorphous state, thereby forming a recorded bit.

27. The method of claim 25, wherein light from the laser reflected from the recording layer portions has a first reflectivity, $R_1$, in unrecorded portions thereof, and a second reflectivity, $R_2$, in recorded portions, wherein $$|R_1 - R_2| < \left(\frac{R_1 + R_2}{2}\right).$$

28. The method of claim 25, wherein light from the laser reflected from the pitted side of the substrate in the pre-recorded tracks in land portions of the substrate between the pits has a third phase, $P_3$, and light from the laser reflected from the pits has a fourth phase, $P_4$, wherein $120° < |P_3 - P_4| < 240°$.

29. A drive for an updatable optical data storage disc, comprising:

a laser having a wavelength $\lambda$ and operates at a first intensity to read data on an updatable optical data storage disc, the disc comprising: (a) pre-recorded information in the form of concentric or spiral tracks and pits, and (b) recordable tracks positioned between adjacent pre-recorded tracks, whereby the tracks on the disc alternate in the radial direction between pre-recorded tracks and recordable tracks, and wherein the laser operates at a second, higher intensity for writing data to the recordable tracks;

a split detector comprising at least two detectors parallel to and aligned with the length of the pre-recorded tracks and spaced from each other such that one detector receives light reflected from a leading edge of the laser beam on a recorded bit while another detector receives light reflected from a trailing edge of the laser beam;

first electronics for generating a first signal using the sum of the measured outputs of the detectors, thereby allowing the drive to read data in the pre-recorded tracks; and second electronics for generating a second signal using the differential of the measured outputs of the detectors, thereby allowing the drive to read data in the recordable tracks.

30. The drive of claim 29, wherein light from the laser reflected from the recordable tracks has a first phase, $P_1$, in unrecorded portions of the recording layer and a second phase, $P_2$, in recorded portions, wherein $30° < |P_1 - P_2| < 100°$.

31. The drive of claim 29, wherein light from the laser reflected from the recordable tracks has a first reflectivity, $R_1$, in unrecorded portions and a second reflectivity, $R_2$, in recorded portions, wherein $$|R_1 - R_2| < \left(\frac{R_1 + R_2}{2}\right).$$

32. The drive of claim 29, wherein light from the laser reflected from the pitted side of the substrate in the pre-recorded tracks in land portions of the substrate between the pits has a third phase, $P_3$, and light from the laser reflected from the pits has a fourth phase, $P_4$, wherein $120° < |P_3 - P_4| < 240°$.

33. An updatable optical storage disc designed for use in the drive of claim 29, the disc comprising:

a substrate containing pre-recorded information in the form of concentric or spiral tracks of pits; and a recording layer on the pitted side of the substrate wherein light from the laser reflected from the recording layer has a first phase, $P_1$, in unrecorded portions of the recording layer and a second phase, $P_2$, in recorded portions of the recording layer, wherein $30° < |P_1 - P_2| < 100°$, and wherein recordable tracks are positioned between pre-recorded tracks, whereby the tracks alternate in the radial direction between pre-recorded tracks and recordable tracks.

* * * * *